(12) United States Patent
Wu et al.

(10) Patent No.: US 8,078,467 B2
(45) Date of Patent: Dec. 13, 2011

(54) DEVICE AND METHOD FOR LANGUAGE MODEL SWITCHING AND ADAPTATION

(75) Inventors: Genqing Wu, Beijing (CN); Liqin Xu, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 942 days.

(21) Appl. No.: 11/683,559

(22) Filed: Mar. 8, 2007

(65) Prior Publication Data

US 2008/0040099 A1      Feb. 14, 2008

(30) Foreign Application Priority Data

Mar. 10, 2006   (CN) .......................... 2006 1 0054785

(51) Int. Cl.
*G10L 15/28* (2006.01)
*G10L 21/00* (2006.01)

(52) U.S. Cl. ............ 704/270; 704/9; 704/255; 704/275; 704/276

(58) Field of Classification Search .................. 704/255, 704/270

See application file for complete search history.

(56) References Cited

U.S. PATENT DOCUMENTS

| | | | |
|---|---|---|---|
| 5,613,036 A * | 3/1997 | Strong | 704/243 |
| 6,233,545 B1 * | 5/2001 | Datig | 704/2 |
| 2002/0032564 A1 * | 3/2002 | Ehsani et al. | 704/235 |
| 2003/0055655 A1 * | 3/2003 | Suominen | 704/276 |
| 2003/0125955 A1 * | 7/2003 | Arnold et al. | 704/270.1 |
| 2003/0182131 A1 * | 9/2003 | Arnold et al. | 704/275 |

FOREIGN PATENT DOCUMENTS

| | | | |
|---|---|---|---|
| JP | 2000-330983 A | 11/2000 | |
| JP | 2004-062517 A | 2/2004 | |

\* cited by examiner

*Primary Examiner* — Justin Rider
(74) *Attorney, Agent, or Firm* — Sughrue Mion, PLLC

(57) ABSTRACT

This invention provides a device and method for language model switching and adaptation, wherein the device comprises a notification manager which notifies a language model switching section of the current status information or the request for the language model of an destination application when the status of the destination application is changed; a language model switching section which selects one or more language models to be switched from a language model set according to the received current status information or the request; a LMB engine decodes a user input using the one or more selected language models; and a language model adaptation section which receives the decoded result and modifies the one or more selected language models based on the decoded result. Therefore, the user input is more accurate even if the language model switching section performs different switches among different language models and the performance of the language models are improved by the language model adaptation section.

23 Claims, 9 Drawing Sheets

DEVICE AND METHOD FOR LANGUAGE MODEL SWITCHING AND ADAPTATION

BACKGROUND OF THE INVENTION

1. Field of the Invention

The present invention relates generally to the field of Nature Language Processing. More specifically, the present invention relates to a device and method for language model switching and adaptation.

2. Description of the Prior Art

Language model technology is one of the key constituents in Natural Language Processing. It is widely used in many fields, such as Speech Recognition (SR), Optical Character Recognition (OCR), Predictive Text Entry (PTE, often for none English language and foil sentence text entry, is often called Sentence-Level Input Method) and etc. Generally, a language model is often used to estimate the probability of a sentence. For example, in speech recognition, the acoustic recognizer gives the acoustic hypothesis sequence, which could generate different sentence candidates. And then, each candidate sentence is scored by the language model, and the one with the highest score is considered to be the best candidates. Similarly, text entry for such none-English languages as Chinese or for such 10-button devices as mobile phone is difficult, because the user need to input a code sequence and choose the desired candidate from a long list. Language model can help to choose the desired candidates automatically, for example, digit sequence "4663" on a mobile phone corresponds to three English word candidates "good/home/gone", if the previous word is "go", the language model can automatically predict "home" to be the first candidate. In one word, a language model can be used to choose candidates when language model-related ambiguity occurs.

But the performance of a language model is quite domain-dependent. If a language-model-based application works in a domain different from the training field, the performance will degrade dramatically. To solve this problem, the language model should foe modified when the domain changes, but if the application needs to switch between many distinct domains frequently, the performance cannot be benefited from the model modification, or the modification even makes the model unusable. This phenomenon will also be explained in the coming sections.

As mentioned above, the general problem in language modeling is the domain-dependent problem. If the destination application works in a fixed domain, this problem may not seem remarkable, but if the application is used among many domains which are quite different from each other, this problem will restrict the language model performance.

General speaking, there are two popular methods for solving the domain-dependent problem. The first one is language model adaptation (LMA), and the second one is language model switching (LMS). Both of them try to enhance the model according to the information provided by the recent input data, such as the input text generated by the input method.

The traditional language model adaptation supposes that the current topic is local stationary, that is, the domain is unchanged through out the procedure of the usage of the language model. Therefore, the recent output text can be used to modify the model so that it will work better in the following procedure. The most popular measure is to establish a cache model using the recent text, and combines the general model with the cache model using interpolation. In some cases, such as the speech recognition for a long document, or the OCR for a long printed document, this method works well.

The traditional language model switching method also supposes that the current topic is local stationary. While in these cases the recent text stream is tar from enough to enhance the language model; instead, the recent text stream is used to judge the current topic, and select a pre-established appropriate model for the current topic.

Because the traditional methods only use the recent text stream for language model adaptation and switching, we call them text-stream-based language model adaptation/switching methods.

As mentioned above, the text-stream-based LMA/LMS methods both suppose that the current topic is local stationary, so the recent text stream can be used to enhance the model. Actually, this suppose is not always satisfied. In some cases, the amount of text stream is too small to be used in language model adaptation, and this text is almost helpless for language model adaptation. In some other cases, the language model applications can switch from a context to another context frequently without providing any text stream, that is, the local stationary property is destroyed. Therefore, neither the language model adaptation nor language model switching method works well.

Particularly, the only thing the text-stream-based methods can use is the recent text stream. Because of the topic's non-stationary nature, the language model adaptation or switching can foe misled. Moreover, when the application is running, the domain of the current application can switch among many fields. Current existing solutions deal with this problem by using the recent text stream to modify the model, or to select a model. Obviously, if the domain-switching is very frequently, the model will be modified dramatically, or the domain changes as soon as the new model is just selected. This will lead to a serious consequence that the previous measure is not consistent with the following input requests. It will impair the model performance rather than bringing improvement.

Take the current widely used Chinese input methods for example, they only know that the current edit field needs to fill in a text string, and they do not care what preference the current application or the current field has. Actually, if the user is filling in an item in a contact manager, edit fields like name, address, position, hobbies and telephone number are necessary. Obviously, these fields are quite different from each other, and the information adapted from the name input can not improve the address input, even more it can mislead the address input, in this case, the text-stream-based methods do not work at all.

Take the sentence level input method for 10-button mobile phones for another example. When the user inputs a short message, the domain is a short message conversation. When the user fills in the name field of the address, book, the domain is name. When the user surges Internet via smart phone, he/she need to fill in the address bar of the browser with a Internet URL, and when the user dials his/her friends, the input domain is telephone number. Similarly, the text-stream-based methods do not help in this case either.

If a speech recognition system replaces the input method in these two examples, the status is similar.

In a word, we can find that the pure text-stream-based methods do not offer an effective mechanism to identify which domain the language model is currently used for (or there is no such fix domain at all) in the above context-sensitive cases, and they do not have an effective method to deal with the domain-dependence problem when a LMB engine application switches among many domains frequently. Furthermore, since the domain detection is inaccurate, the model adaptation is conducted hit or miss.

SUMMARY OF THE INVENTION

Actually, we find that in some cases, the language model request is fixed and concrete. For example, the input field of the contact manager on a mobile phone requests a name input, we think this request can be acquired and used for language model switching and adaptation.

Therefore, the present invention has been made in view of the above problems, it is an object of this invention to provide a method and device for language model switching and adaptation. The invention includes selecting appropriate language model for specific scenes when the status of a destination application is changed, and use the result text stream feedback to modify the specific models. Therefore, the domain-dependence problem is solved when switching is performed among different language models and the adaptation to the specific language models improves the characteristics of language models.

According to the first aspect of this invention, a device for language model switching and adaptation is provided, comprising: a notification manager which notifies a language model switching section of the current status information or the request for the language model of an destination application when the status of the destination application is changed; a language model switching section which selects one or more language models to be switched from a language model set according to the received current status information or the request; a LMB engine decodes a user input using the one or more selected language models; and a language model adaptation section which receives the decoded result and modifies the one or more selected language models based on the decoded result.

According to the second aspect of this invention, a method for language model switching and adaptation is provided, comprising: a notification step of notifying the current status information or the request for the language model of an destination application when the status of the destination application is changed; a language model switching step of selecting one or more language models to be switched from a language model set according to the received current status information or the request; a decode step of decoding a user input using the one or more selected language models; and a language model adaptation step of receiving the decoded input and modifying the one or more selected language models based on the decoded input.

Unlike the conventional solution for language model domain-dependent problem, this invention builds specific models for its corresponding domains and utilizes the destination application's status, and also the history text data (r) used. Furthermore, the LMB engine communicates with the destination application and exchange important information, the advantage of this invention are described as follows:
1. It offers a mechanism to develop LMB engine that works in many different domains and switches between them frequently.
2. Each language model can vary very much from others; even the vocabulary can be totally different, which makes the LMB engine more flexible.
3. Because the language model adaptation is conducted upon the current specific model(s), this make if much more purposeful and effective than the general model adaptation,
4. Because the IBM engine can communicate with the destination application, this makes it possible to develop new destination applications that have their unique requests, and the communication mechanism can be used to add new language models to the language model sets to fulfill the new request. That's means this method provides a good extensibility to IBM engine application.

Because of the advantages described as above, it can improve the LMB engine performance.

BRIEF DESCRIPTION OF THE DRAWINGS

These and/or other aspects and advantages of the present invention will become apparent and more readily appreciated from the following description of the embodiment, taken in conjunction with the accompany drawings of which.

DETAILED DESCRIPTION OF THE PREFERRED EMBODIMENTS

Figure 1:
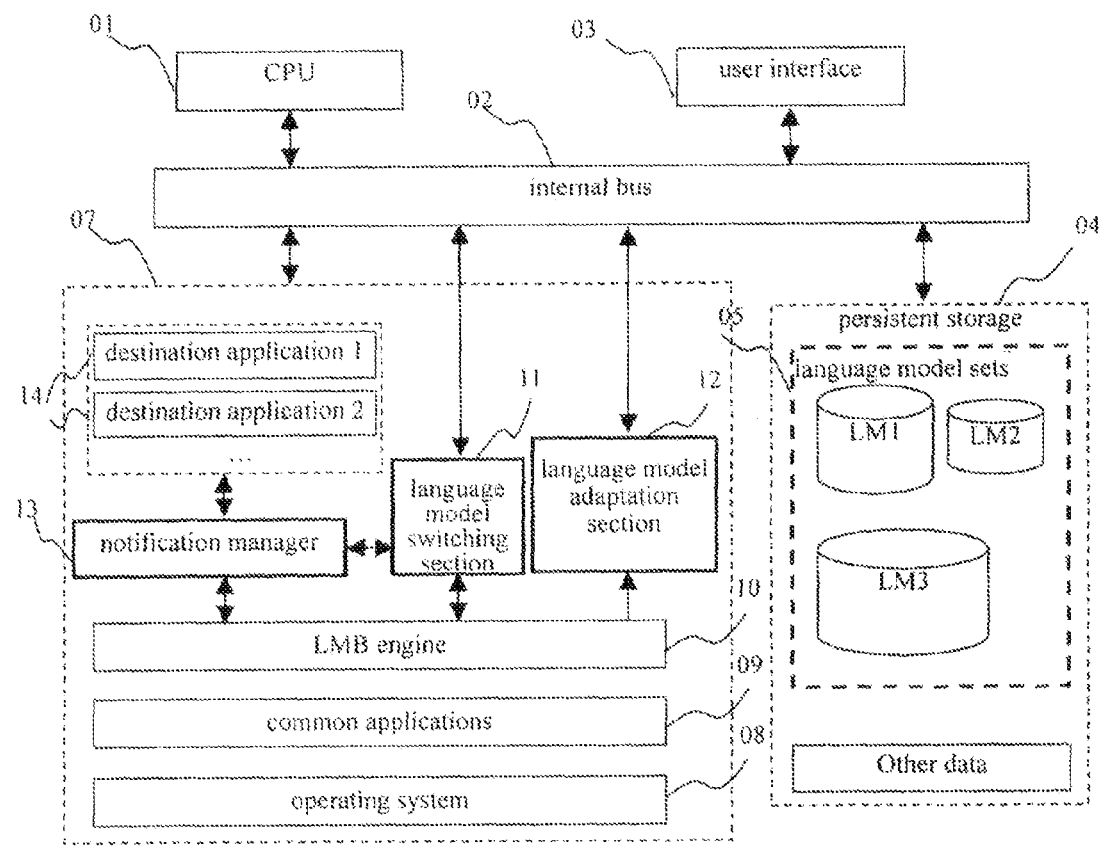
FIG. 1 is a schematic block diagram of a device for language model switching and adaptation according to an embodiment this invention.

FIG. 1 shows the schematic block diagram of the device for language model switching and adaptation according to this invention. The device comprises a CPU 01 which offers computing ability for all applications, an internal bus 02 through which the device exchanges data between a memory 07 and a persistent storage 04 (it can be hard disks or flash memory), common applications 09 and a user interface 03 which is the especially keyboards for key input and microphones for voice input, etc. The persistent storage 04 stores language model set 05 and some other data 08. The device further comprises a destination application 14, a language model adaptation section 12, a language model switching section 11, a notification manager 13 and a language model related (LMB) engine 10.

The LMB engine 10 generally uses language model and offers language-model-related services for applications. The LMB engine 10 is, for example, a text input engine or a speech recognition engine. The destination application 14 is an application that receives language model-related services from the LMB Engine 10, such as the Notepad, Word application, and a mail editor etc.

The language model set 05 manages a set of language models for different situations.

The language model switching section 11 switches among different language models. The notification manager 13 communicates notification information between the language model switching section 11 and the destination application 14. When the status of the destination application 14 is changed or the request for specific language model (s) is sent, the notification manager 13 will perceives this. So the notification manager 13 will send the concrete request for specific language model (s) or status information of the destination application to the language model switching section 11, such that the language model switching section 11 switches the current language model to an appropriate one to enhance the performance. The language model switching section 11 translates the status information into the request for language model(s) and selects the corresponding language model (s) according to a mapping table. Such mapping table is stored as other data 08 on the persistent storage 4 and it will be illustrated in FIG. 5.

The language model adaptation section 12 is used to self-adapt the language model according to the feedback input result. When the LMB engine 10 decodes the user input by using the current active model, the language model adaptation section 12 receives the decoded input and modifies the current active language model according to the decoded input.

Therefore, the language model adaptation section 12 offers a result feedback channel to utilize the result text from the LMB engine 10 to perform adaptation upon the current active model. The language model switching section 11 and the language model adaptation section 12 also offer an interface to access the language model set. The notification manager 13 acts as a bridge between these components.

In some cases, the language model set 05, the language model switching section 11, the language model adaptation section 12 and the notification manager 13 can be merged into one module, or can be embedded into LMB engine 10.

Figure 2:
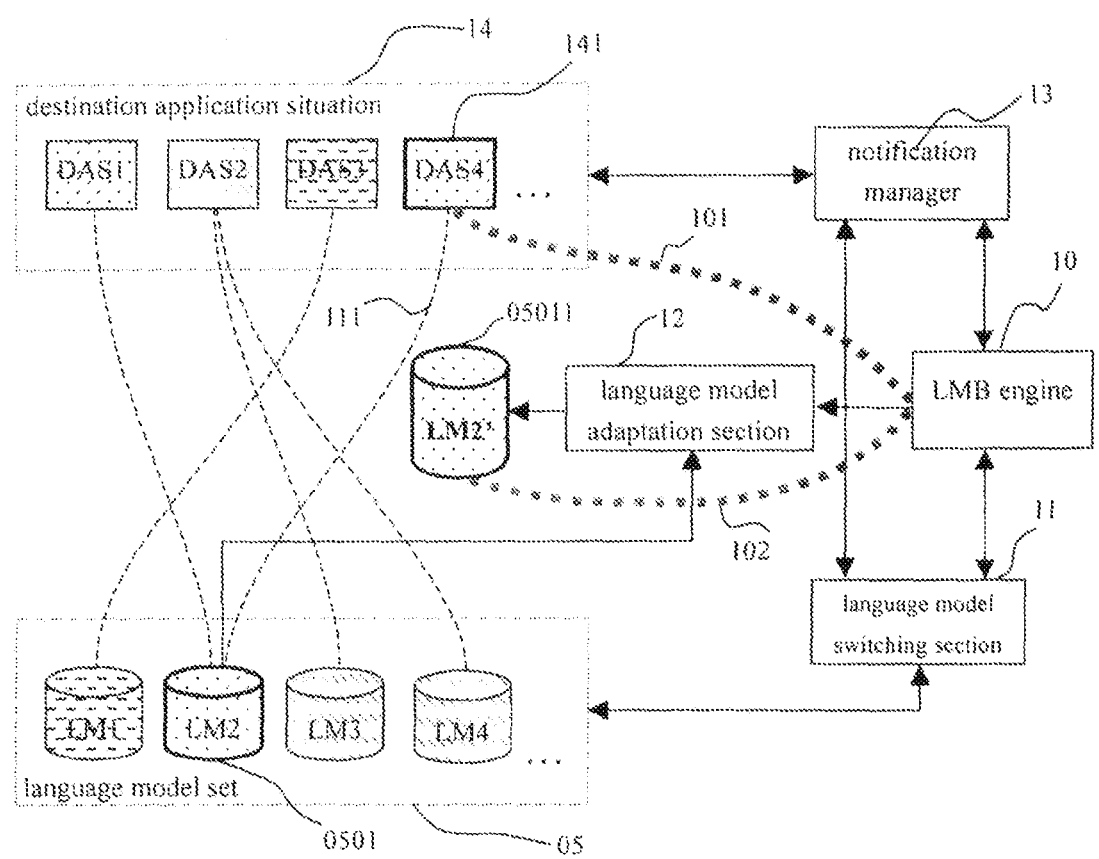
FIG. 2 is a schematic block diagram of the key components of the device performing the switching and adaptation process according to this invention.

FIG. 2 shows the key components of the device of FIG. 1 performing the switching and adaptation process. In this FIG., only the key components 05, 10, 11, 12, 13 and 14 are illustrated. For the purpose of clear illustration, the status of a destination application is indicated by 14'. Each destination application 14 has their respective status 14', such as the destination application status DAS4 141. When the current destination application 14 changes (or just switches from one Field to another in the same application and a new request occurs), the status is changed, and the notification manager 13 will perceive tills change and inform the language model switching section 11 to select an appropriate model(s) or to adapt the current model(s) to this ad hoc status. One language model can be used by more than one destination application status (LM2 is used by both DA1 and DA4), and one status can also need more than one language models to combine together to fulfill its request (LM3 and LM4 combine together to work for DAS2).

In this FIG., DAS4 141 is the current active destination application status, and the language model 0501 is the current active language model. The dash line 111 between them shows this relationship, and the bold dash lines 101 and 102 show the LMB engine 10 using the current active language model(s) for the current active destination application status. After language model switching section 11 selects the appropriate language model(s) from the language model set 0501 for the current destination application DAS4 141, the feedback result are used to improve the current active language model(s) 0501, and the language model(s) which is adapted by the language model adaptation section 12 is presented as 05011. The LMB engine 10 decodes the input of the user and provides the decoded input result to the language model adaptation section 12, such that the language model adaptation section 12 modifies the current active language model 0501 to the adapted language model 05011. If the feedback result is not available, the adaptation work can be omitted.

Figure 3:
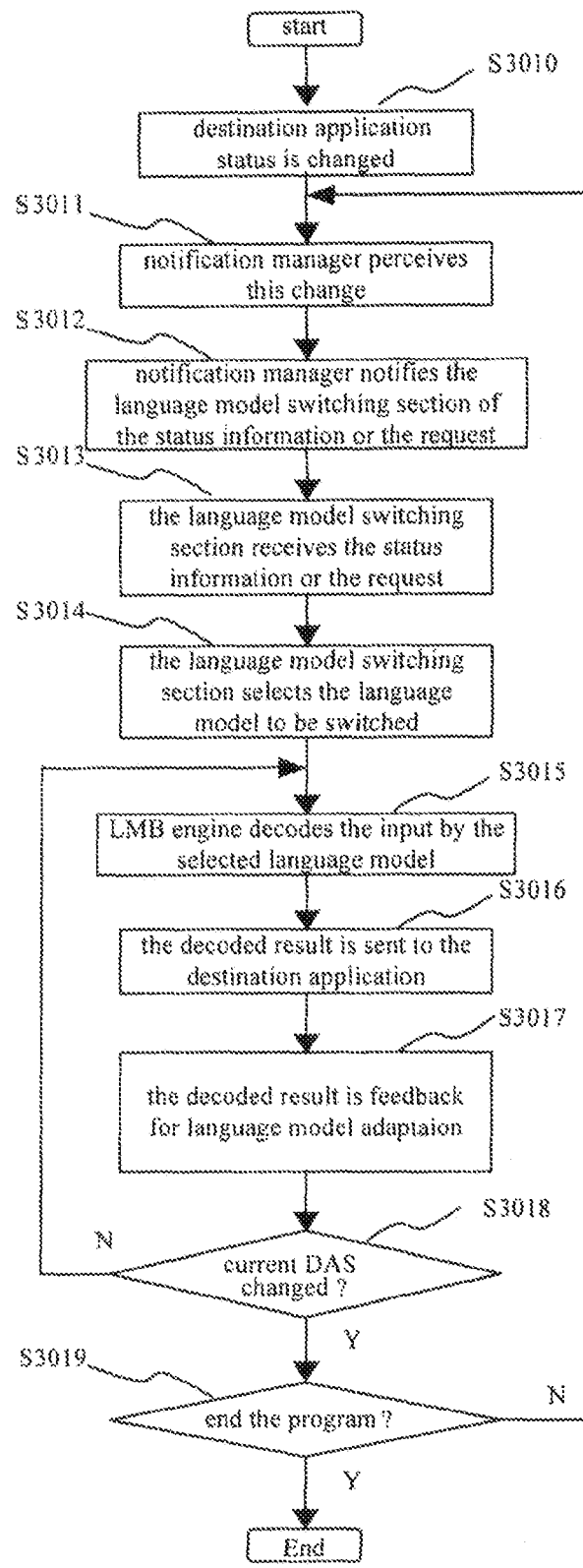
FIG. 3 is a flow chart illustrating a method for switching and adapting language model.

Now a method for switching and adapting language model will be described with reference to FIG. 3 and FIG. 1. FIG. 3 illustrates the general flow chart of the method. At S3010, the current status of the destination application is changed (which means a new Field of the current destination application is activated or a new destination application is activated or the request for language model is sent from the destination application). At S3011, the notification manager 13 perceives this change, and notifies the language model switching section 11 of the current status information or the request for language model at S3012. The language model switching section 11 receives this at S3013 and selects the corresponding language model according to the current status information or the request for language model at S3014, wherein the language model switching section 11 translates the status information into the request for language model first when the status information is received. At S3015, the LMB engine 10 uses the new active language model to decode the input received from the user, and the decoded result is sent to the destination application 14 at S3018. Further more, the decoded result is feedback to the language model adaptation section 12 for language model adaptation, thus the performance of the corresponding model is enhanced at S3017.

In this way, a loop of decoding and feedback adaptation is finished by performing S3015, S3016 and S3017. If it is determined at S3018 that the current destination application status 14' does not change, the process jumps to S3015 and repeats the decoding and adaptation loop. Else if the current destination application status 1400 changes and at S3019 the user does not intend to end the program, the process jumps to S3010 and repeats the whole process.

Figure 4:
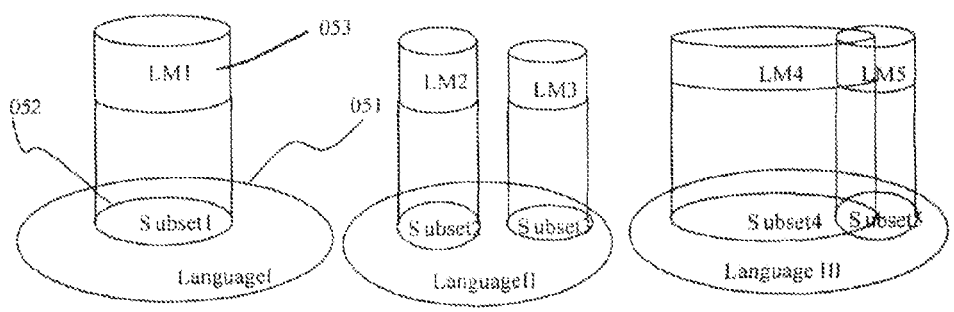
FIG. 4 shows a logical structure diagram of language model set of the present invention.

FIG. 4 shows a logical structure of the language model set of the present invention. In FIG. 4, five language models are presented. And the language model LM1 is marked as 053. LM1 053 denotes the whole space of a specific language I (a union of several languages is also possible if necessary). Part 052 is subset 1 of the space of the language I and corresponds to a specific domain. The LM1 053 is constructed on this subset 1 and describes its characteristics. A subset is a subspace of a language, e.g. the Chinese names, the family address presentation, the ID card number (in Chinese, there are some rules for ID card number), etc. As shown in FIG. 4, more than one specific language models can be in a language, and overlaps between two or more subsets are also allowed.

Figure 5:
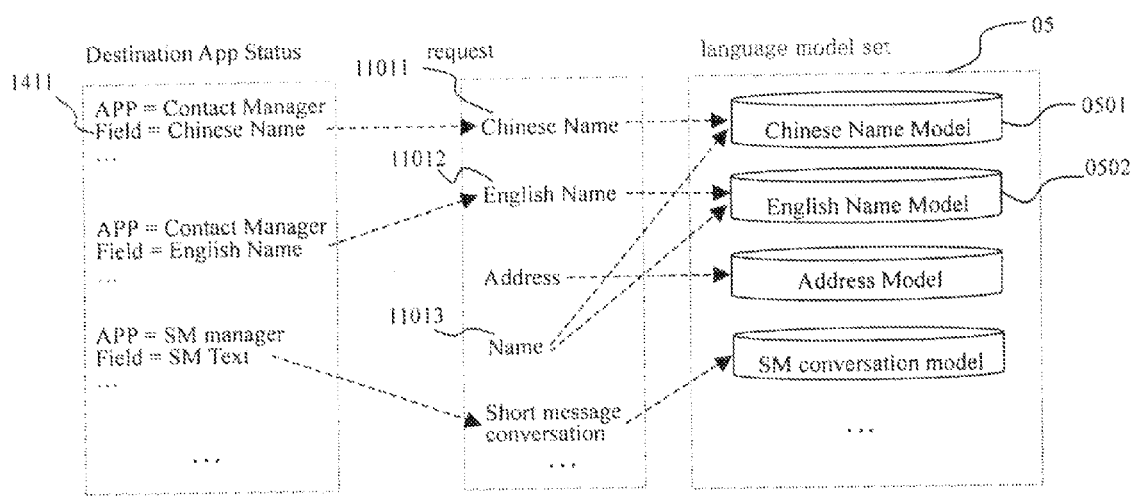
FIG. 5 is a schematic structure of a mapping table according to the present invention.

FIG. 5 shows an example of a schematic structure of a mapping table according to the present invention. The mapping table maps the destination application status to the request for the language model(s) in the language model sets. The mapping table helps the language model switching section 11 and the language model adaptation section 12 select an appropriate language model (s) for a specific destination application status.

Part 1411 shows a destination application status. The destination application status includes the application name, input field name and input field ID, etc A destination application status is mapped to a concrete request, such as part 11011, part 11012, part 11013, or to a specific domain. Then a request is mapped to specific language model(s) (such as Model 0501, Model 0502) for the domain in the language model set 05. In the exemplary mapping table, the part 11012 in the request corresponds to a single model 0501, while the part 11013 in the request corresponds to two models 0501 and 0502, if the destination application offers a concrete request (i.e., a request for language model), the language model switching section 11 will look up the appropriate language model(s) according to the request, if the destination application can not offers a concrete request but the status, the language model switching section 11 should first translate this status into a concrete request.

Figure 6:
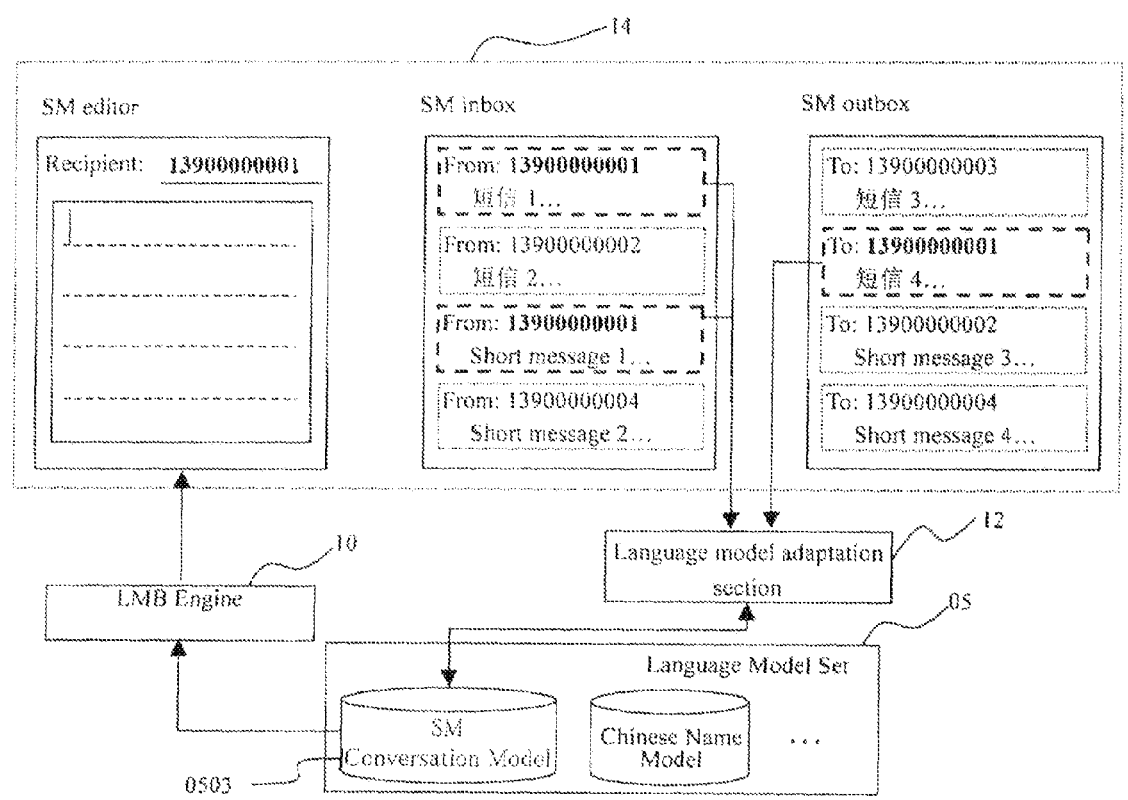
FIG. 6 is a schematic diagram illustrating an exemplary device performing the language model adaptation.

FIG. 6 illustrates an exemplary device performing the language model adaptation. This FIG. shows how the language model adaptation is conducted when the LMB engine 10 works for a destination application, i.e., a short message manager 14.

In the short message manager 14, three views are listed. The SM (short message) editor is used to compose a new message or reply to an incoming message, and the SM Inbox and SM outbox are used to store messages received from others and messages sent out respectively. Because this FIG. is only for illustrating how the adaptation text is used to enhance the performance of the specific model, only the key components for language model adaptation is presented, and other components such as the notification manager 13 and the language model switching section 11 are omitted here. The language model adaptation section 12 gets text stream of the current conversation from the short message manager, and modifies the current language model 0503 in the language model set 05 based on the text stream. And the LMB engine 10 uses the enhanced model to direct the input decoding.

Figure 7:
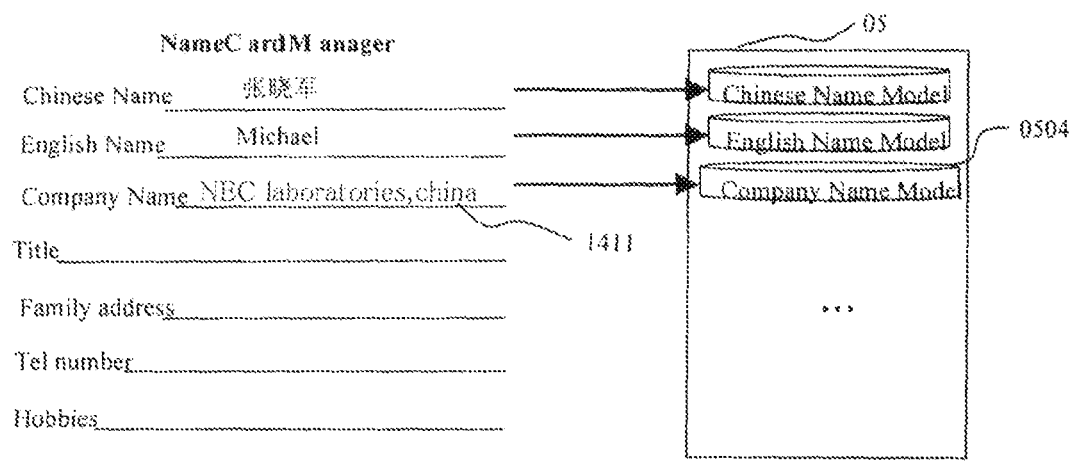
FIG. 7 is a schematic diagram Illustrating an example of status change of a destination application.

FIG. 7 is a schematic diagram illustrating an example of status change of a destination application. The name card manager is an example destination application 14, which has many distinct input requests for its different fields, A user will input information to fill in the name card manager. As shows in FIG. 7, part 1411 is the current input field and it is a company name field. This request will be perceived by the notification manager 13, and the language model switching section 11 will select an appropriate model 0504 from the language mode sets 05 to make the input by the user more accurate.

Figure 8:
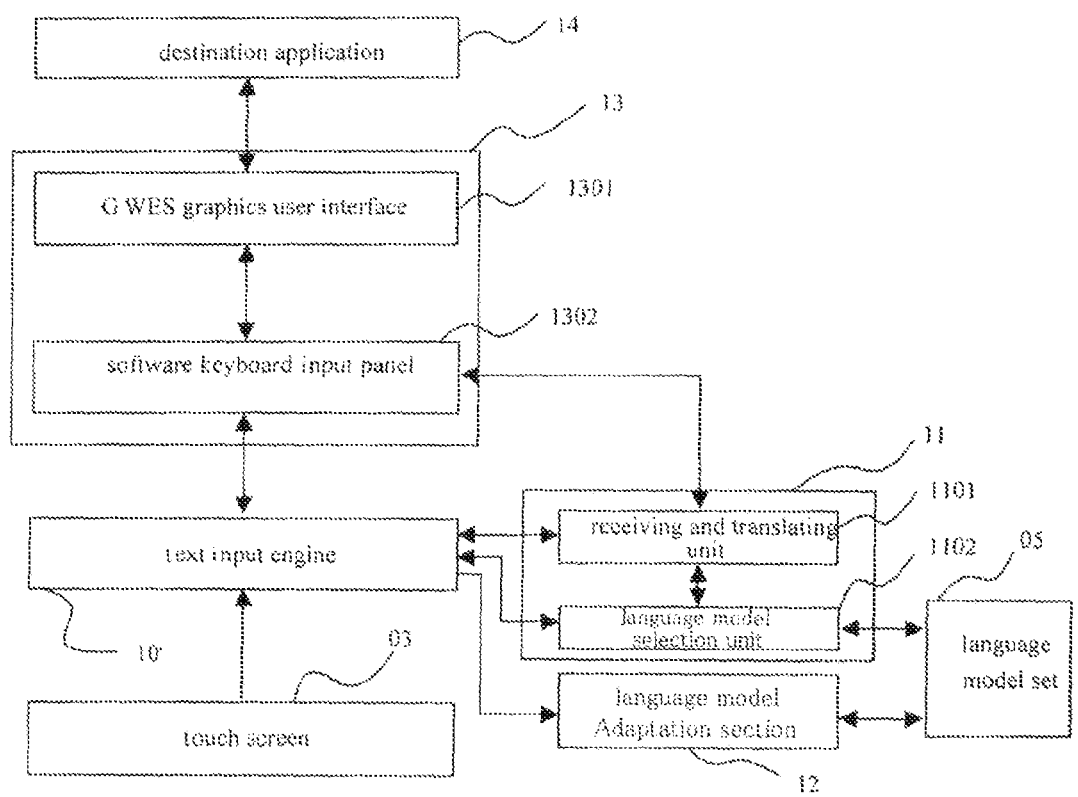
FIG. 8 is a schematic block diagram of a device for language model switching and adaptation according to an example of this Invention.

FIG. 8 shows a schematic diagram of the device for language model switching and adaptation according to an example of this invention. The device 100 is working under WinCE OS.

The main component (the notification manager 13) of this FIG. comes from Microsoft MSDN document, and the following illustration also partly comes from the MSDN document. The text input engine 10' is such an application to transform the user's physical input info meaningful content, e.g. the Chinese characters are encoded in Pinyin, actually each Pinyin is a string of alphabet letters and corresponds to a pronunciation. Because of the huge number of the Chinese characters, a Chinese character cannot be input by a key directly (actually, such a keyboard with so many keys does not exist), instead, the user input the Pinyin string, and selects the desired character from the decoding candidates result. Since there are so many homophones in Chinese, language models can be used to core all the candidates, especially for sentence level input method, language models are very necessary.

In this FIG., the destination application 14 is, for example, the Pocket WORD. The text input engine 10' uses the language model set 05 via the language model switching section 11 and the adaptation section 12 to predict the whole sentence candidates for the destination application. The text input engine 10' communicates with the destination application 14 via the notification manager 13.

The notification manager 13 comprises two units: a GWES graphics user interface 1301 and a soft keyboard input panel (SIP) 1302. The GWES graphics user interface 1301 is the GWES (Graphics, Windowing, and Events Subsystem, which contain most of the core Microsoft® Windows® CE functionality) module, and it offers low-level system support. The GWES graphics user interface 1301 detects the change of status for the destination application 14. The SIP 1302 actually manages the touch screen and provides the communication support between the destination application and the Text Input Engine. The SIP 1302 is a part of the WinCE OS and perceives the state change of the destination application. SIP 1302 has a mechanism to notify the text input engine 10' of the state changes and to request actions and information from the text input engine 10'. Particularly, it contains a function interface (refer to Microsoft Developer Network for details) and can do a lot of work for the communication. It can inform the text input engine 10' that the destination application 14 is changing its state, e.g. the destination application's current Input field is a name field requiring to input a Chinese name, or the current field is requiring to input an Old Chinese Poem (the Old Chinese Poem is almost totally different from the modern Chinese, in which one sentence usually contains 5 or 7 characters and one poem usually contains 4 sentences). Further more, if the destination application 14 knows that its request is very bizarre and the text input engine 10' does not includes such area information, it can even add special lexicon and new language model to the language model set to enhance the input performance for the specific domain. That's to say, this mechanism offers a good extensibility for the text input engine 10'.

The language model switching section 11 includes two units. One is a receiving and translating unit 1101, and the other is a language model selection unit 1102. The receiving and translating unit 1101 manages a list of file destination application 14 and their corresponding request for different input fields. The receiving and translating unit 1101 receives status information and analysis the request, or translates the status information into a concrete request for language model, and then passes its translation result to the language model selection unit 1102 to determine which language model(s) should be used.

Actually, there are two modes for the language model switching section 11 to determine the request of the current input field, one is passive, and the other one is active. In the active mode, the destination application knows the detail of the request specification defined by the language model switching section, and sends its request for language model to the language model switching section 11 via the notification manager 13 directly. The language model switching section 11 receives its request for language model and switches the model(s). In the passive mode, the destination application 14 is not aware of the specific request description defined by the language model switching section 11 and sends out nothing. The language model switching section 11 should inquire the destination application's status, e.g. the application title, input field title, input field's ID, etc. The receiving and translating unit 1101 gets this information and translates the information info a concrete request. In some cases, both the passive and active modes are used for request determination.

The language model adaptation section 12 adapts the selected language model. One thing must be pointed out that the language model adaptation is conduct upon the active model(s), not the whole model set. After the notification manager 13 selects the appropriate model(s), the text, input engine 10' decodes the input information from the user and provides it to the language model adaptation section 12. Therefore, the language model adaptation section 12 uses this feedback to enhance the performance of the active model(s).

According to this example of this invention, it is not necessary for the input method to change the software keyboard layout when the destination application's request changes. It just needs to load different language model(s) to fulfill the current specific request.

Figure 9:
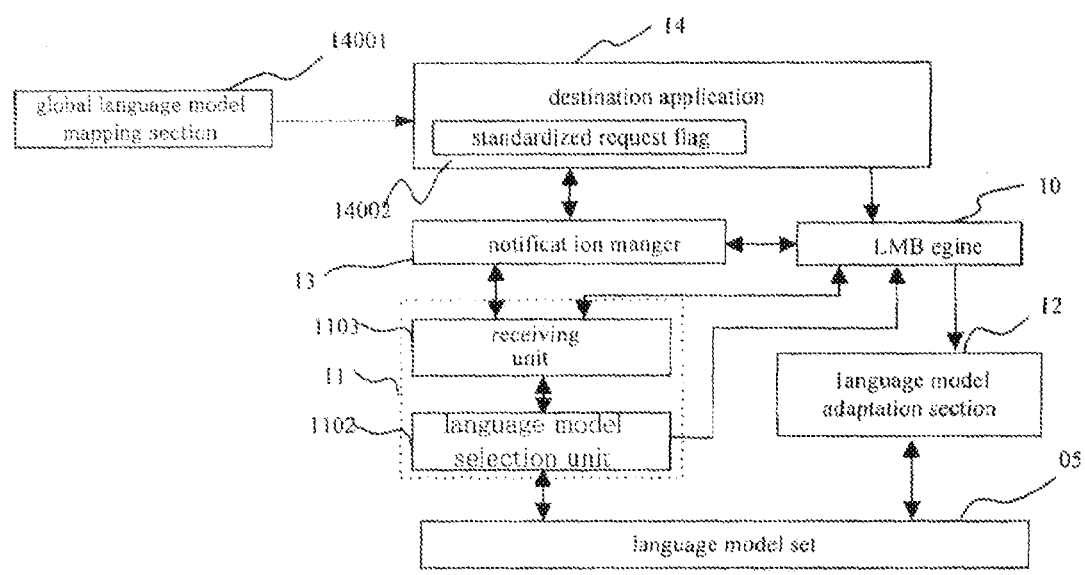
FIG. 9 is a schematic block diagram of a device for language model switching and adaptation according to another example of this invention.

FIG. 9 shows a schematic diagram of a device for language model switching and adaptation according to another example of the present invention. The device comprises a global language model mapping section 14001, a destination application 14, a notification manager 13, a LMB engine 10, a language model switching section 11, a language model adaptation section 12 and a language model set 05. The global language model mapping section 14001 maps the status of the destination application 14 to a language model(s) according to a standardized language model domain division specification which is stored in the global language model mapping section 14001. In this specification, language domain is divided into some small domains and each domain is assigned with a unique ID. The divided domains are corresponding to the requests for language model(s) and the requests have been specified in this specification in detail. The request is, for example, Chinese name, English name as FIG. 5 shown. The global language model mapping section 14001 can be embedded into the operation system of the device.

Therefore, the destination application 14 uses this global language model mapping section 14001 and a standardized request flag to determine the corresponding concrete request when its status is changed, thus the request is represented without any ambiguity. The standardized request flag (not shown) is embedded in the destination application 14 and it indicates the request for language model(s) when the status of the destination application is changed. The notification manager 13 cooperates with the LMB engine 10, the language model switching section 11 and the language model adaptation section 12 to select an appropriate model(s) for the current concrete request and adapt a specific model(s) if necessary. Different from FIG. 8, the language model switching section 11 includes a receiving unit 1103, not a receiving and translating unit 1101. The language model switching section 1103 only receives standard request and does not need to do any translation work because the destination application 14 knows its request using the global language model mapping section 14001 and sends the request to the notification manager 13 directly.

Although an embodiment of the present invention has been shown and described, it will be appreciated by those skilled in the art that changes may be made in the embodiment without departing from the principles and spirit of the invention, the scope of which is defined in the appended claims and their equivalents.

What is claimed is:

1. A device for language model switching and adaptation, comprising:
   a notification manager which notifies a language model switching section of the current status information or the request for the language model of an destination application when the status of the destination application is changed;
   a language model switching section which selects one or more language models to be switched from a language model set according to the received current status information or the request;
   a Language Model (LMB) engine which decodes a user input using the one or more selected language models; and
   a language model adaptation section which receives the decoded result and modifies the one or more selected language models based on the decoded result,
   wherein the current status information indicates if a new destination application among a plurality of destination applications is activated, and
   wherein the plurality of destination applications are software applications that receives language model-related service.

2. The device of claim 1, wherein the LMB engine is a voice recognizing engine.

3. The device of claim 1, wherein the LMB engine is a text input engine.

4. The device of claim 1, wherein the language model switching section comprises:
   a receiving and translating unit which receives the current status information or the request for the language model from the notification manager and translates the status information into a request for language model by searching a mapping table when the current status information is received; and
   a language model selection unit which selects one or more language models to be switched from the language model set based on the request for the language model or the translated request for language model.

5. The device of claim 3, wherein the language model switching section comprises:
   a receiving and translating unit which receives the current status information or the request for the language model from the notification manager and translates the status information into a request for language model by searching a mapping table when the current status information is received; and
   a language model selection unit which selects one or more language models to be switched from the language model set based on the request for the language model or the translated request for language model.

6. The device of claim 1, wherein the notification manager comprises:
   a Graphics, Windows and Events Subsystem (GWES) graphics user interface which detects the change of the status of the destination application; and
   a software keyboard input panel which notifies the language model switching section of the current status information or the request for the language model of the destination application.

7. The device of claim 4, wherein the notification manager comprises:
   a GWES graphics user interface which detects the change of the status of the destination application; and
   a software keyboard input panel which notifies the language model switching section of the current status information or the request for the language model of the destination application.

8. The device of claim 5, wherein the notification manager comprises:
   a GWES graphics user interface which detects the change of the status of the destination application; and a software keyboard input panel which notifies the language model switching section of the current status information or the request for the language model of the destination application.

9. The device of claim 1, wherein one language model of the Language model set overlaps another language model within one language domain.

10. The device of claim 1, the device further comprising:
    a global language model mapping section which maps the status of the destination application to the corresponding one or more language models,
    wherein the destination application knows the request for language model by a request flag and the global language model mapping section, and sends the request for language model to the notification manager.

11. The device of claim 10, wherein the language model switching section comprises: a receiving module which receives the request for language model of the destination application from the notification manager; and a language model selection module which selects one or more language models to be switched from the language model set according to the received request.

12. A method of language model switching and adaptation, comprising:

a notification step of notifying the current status information or the request for the language model of a destination application when the status of the destination application is changed;

a language model switching step of selecting one or more language models to be switched from a language model set according to the notified current status information or the request;

a decode step of decoding a user input using the one or more selected language models; and a language model adaptation step of receiving the decoded result and modifying the one or more selected language models based on the decoded result, wherein the current status information indicates if a new destination application among a plurality of destination applications is activated, and wherein the plurality of destination applications are software applications that receive language model-related service.

13. The method of claim 12, wherein the user input is a voice recognizing input

14. The method of claim 12, wherein the user input is a text input.

15. The method of claim 12, wherein the language model switching step comprises:

a receiving and translating step of receiving the current status information or the request for the language model and translating the status information into a request for language model by searching a mapping table when the current status information is received; and a language model selection step of selecting one or more language models to be switched from the language model set based on the request for the language model or the translated request for language model.

16. The method of claim 14, wherein the language model switching step comprises:

a receiving and translating step of receiving the current status information or the request for the language model and translating the status information into a request for language model by searching a mapping table when the current status information is received; and a language model selection step of selecting one or more language models to be switched from the language model set based on the request for the language model or the translated request for language model.

17. The method of claim 12, wherein the notification step comprises:

a detection step of detecting the change of the status of the destination application; and a communication step of notifying the current status information or the request for the language model of the destination application.

18. The method of claim 15, wherein the notification step comprises:

a detection step of detecting the change of the status of the destination application; and a communication step of notifying the current status information or the request for the language model of the destination application.

19. The method of claim 16, wherein the notification step comprises:

a detection step of detecting the change of the status of the destination application; and a communication step of notifying the current status information or the request for the language model of the destination application.

20. The method of claim 12, wherein one language model of the Language model set overlaps another language model within one language domain.

21. The method of claim 12, the method further comprising:

a global language model mapping step which maps the status of the destination application to the corresponding one or more language models, wherein the destination application knows the request for language model by a request flag and the global language model mapping step, and providing the request for language model to the notification step.

22. The method of claim 21, wherein the language model switching step comprises:

a step of receiving the request for language model from the destination application; and a language model selection step of selecting one or more language models to be switched from the language model set according to the received request.

23. The device of claim 1, wherein the current status information indicates if a new field among a plurality of fields in the destination application is activated.

* * * * *

UNITED STATES PATENT AND TRADEMARK OFFICE
CERTIFICATE OF CORRECTION

PATENT NO. : 8,078,467 B2
APPLICATION NO. : 11/683559
DATED : December 13, 2011
INVENTOR(S) : Genqing Wu and Liqin Xu Page 1 of 2

It is certified that error appears in the above-identified patent and that said Letters Patent is hereby corrected as shown below:

In the Drawings

Sheet 9 of 9 (Reference No. 13) (fig. 9), Line 1: Delete "manger" and insert -- manager --, therefor In the Specifications Column 1, Line 16: Delete "foil" and insert -- full --, therefor Column 1, Line 39: Delete "foe" and insert -- be --, therefor Column 1, Line 51: Delete "General" and insert -- Generally --, therefor Column 1, Line 60: Delete "through out" and insert -- throughout --, therefor Column 2, Line 3: Delete "tar" and insert -- far --, therefor Column 2, Line 26: Delete "foe" and insert -- be --, therefor Column 2, Line 46: Delete "input, in" and insert -- input. In --, therefor Column 2, Line 51: Delete "address," and insert -- address --, therefor Column 3, Line 50: Delete "(r)" and insert -- is --, therefor Column 3, Line 61: Delete "if" and insert -- it --, therefor Column 3, Line 62: Delete "adaptation," and insert -- adaptation. --, therefor Column 3, Line 63: Delete "IBM" and insert -- LBM --, therefor Column 4, Line 1: Delete "That's" and insert -- That --, therefor Column 4, Line 2: Delete "IBM" and insert -- LBM --, therefor Signed and Sealed this
Thirtieth Day of July, 2013

Teresa Stanek Rea
*Acting Director of the United States Patent and Trademark Office*

CERTIFICATE OF CORRECTION (continued)
U.S. Pat. No. 8,078,467 B2

Column 4, Line 14: Delete "invention," and insert -- invention. --, therefor

Column 4, Line 26: Delete "Illustrating" and insert -- illustrating --, therefor Column 4, Line 30: Delete "Invention." and insert -- invention. --, therefor Column 4, Line 47: Delete "08." and insert -- 06. --, therefor Column 5, Line 9: Delete "08" and insert -- 06 --, therefor Column 5, Line 37: Delete "Field" and insert -- field --, therefor Column 5, Line 39: Delete "tills" and insert -- this --, therefor Column 6, Line 2: Delete "Field" and insert -- field --, therefor Column 6, Line 18: Delete "S3018." and insert -- S3016. --, therefor Column 6, Line 18: Delete "Further more," and insert -- Furthermore, --, therefor Column 6, Line 33: Delete "I" and insert -- 1 --, therefor Column 6, Line 35: Delete "I" and insert -- 1 --, therefor Column 6, Line 53: Delete "etc" and insert -- etc. --, therefor Column 6, Line 61: Delete "0502, if" and insert -- 0502. If --, therefor Column 7, Line 8: Delete "Inbox" and insert -- inbox --, therefor Column 7, Line 24: Delete "fields," and insert -- fields. --, therefor Column 7, Line 40: Delete "info" and insert -- into --, therefor Column 7, Line 46: Delete "exist), instead," and insert -- exist). Instead, --, therefor Column 8, Line 10: Delete "Input" and insert -- input --, therefor Column 8, Line 15: Delete "Further more," and insert -- Furthermore, --, therefor Column 8, Line 25: Delete "file" and insert -- the --, therefor Column 8, Line 49: Delete "info" and insert -- into --, therefor Column 8, Line 55: Delete "text," and insert -- text --, therefor In the Claims Column 11, Line 29: In Claim 13, delete "input" and insert -- input. --, therefor